Dec. 2, 1969

D. M. BROWN 3,481,796

METHOD OF PRODUCING HOMOGENEOUS CRYSTALS OF CONCENTRATED
ANTIMONY-BISMUTH SOLID SOLUTIONS

Filed April 30, 1965

Inventor:
Dale M. Brown,
by John F. Ahern
His Attorney

Inventor:
Dale M. Brown,
by John F. Ahern
His Attorney.

United States Patent Office 3,481,796
Patented Dec. 2, 1969

3,481,796
METHOD OF PRODUCING HOMOGENEOUS CRYSTALS OF CONCENTRATED ANTIMONY-BISMUTH SOLID SOLUTIONS
Dale M. Brown, Schenectady, N.Y., assignor to General Electric Company, a corporation of New York
Continuation-in-part of application Ser. No. 325,392, Nov. 21, 1963. This application Apr. 30, 1965, Ser. No. 452,325
Int. Cl. B01j 17/00; C22c 31/00
U.S. Cl. 148—1.6
4 Claims

ABSTRACT OF THE DISCLOSURE

A method of producing a large semiconductive crystal that exhibits high thermoelectric efficiency, which method comprises: providing a substantially pure, homogeneously mixed polycrystalline body consisting essentially of from 2–16 atomic weight percent antimony, remainder bismuth; heating at least a portion of said body to a first temperature of about 300° C. at which temperature said portion is molten; providing a temperature gradient from said first temperature to a temperature below the freezing point of said composition; establishing controlled directional crystallization from the molten phase by moving said temperature gradient relative to said body at a rate of progression which is not greater than the quantity $$\frac{GD}{\Delta T_{LS}(\text{percent})}$$

where:
G = the temperature gradient;
D = the diffusion coefficient of antimony in bismuth; and
$\Delta T_{LS}$(percent) = the difference between the melting point and freezing point of said composition, to provide a monocrystalline ingot of concentrated antimony-bismuth solid solution.

---

This application is a continuation-in-part of my copending application Ser. No. 325,392, filed Nov. 21, 1963, now abandoned and assigned to the present assignee. The present invention relates generally to methods of producing large homogeneous crystals constituted of solid solutions, and more particularly relates to methods of producing such crystals of concentrated antimony-bismuth solid solutions.

The antimony-bismuth system of solid solution alloys offers semiconductive materials possessing band gaps and other characteristics highly desirable for many applications. For example, some of these alloys are known to be particularly well adapted for use in thermoelectric devices wherein they exhibit a high figure of merit, particularly at lower temperatures, resulting in efficient heat pumps and generators of electricity. The term thermoelectric is used herein to include phenomena explained by the Peltier and Seebeck effects, phenomena wherein these effects are enhanced by magnetic fields, and the Ettingshausen effect.

Thermoelectric and other effects and characteristics of antimony-bismuth alloys are anisotropic. By this it is meant that the various effects and characteristics may vary with changes in the crystallographic orientation of the material. Heretofore, concentrated antimony-bismuth alloys (for example, alloys containing greater than two per cent of either constituent) have been available only in polycrystalline form, in which form there are a plurality of small randomly oriented crystals. The random orientation of the various crystals reduces or destroys the desired property.

Furthermore, the properties of such alloys are highly dependent on the compositional homogeneity of the material. Such alloys as have previously been prepared, however, have only been homogeneous on a macroscopic scale, for example, of constant composition within one percent only over large distances of approximately one inch. Thus, the degree of homogeneity required for full realization of the properties of this material has not previously been achieved. Since the desired properties vary with change in composition, the results obtained depend on the individual crystal and cannot be repeated or predicted in advance. In order to maximize the efficiency of thermoelectric and other anisotropic effects in concentrated antimony-bismuth alloy systems, it is highly desirable to provide large homogeneous crystals of these concentrated solid solution alloys. In this way, the crystallographic axes of the crystal can be oriented to enhance the efficiency of a given anisotropic effect.

I have found that the above-mentioned problems are caused by constitutional supercooling in the melt from which the crystal is being prepared and consequent fractional precipitation of crystals from the melt. Constitutional supercooling occurs when a portion of the liquid at a point removed from the crystal-liquid interface cools below the melting point of the composition of the portion. Although the temperature remains high enough so that the liquid does not freeze, the solution becomes supersaturated. Accordingly, any disturbance of the system causes the sudden crystallization of a large number of crystals of the solute from the supersaturated portion. Some of these may melt and reenter the solution if the temperature becomes sufficiently high but many remain and serve as nucleation points which cause the formation of a plurality of small crystals. In addition, the precipitation of varying amounts of the solute at different times destroys the desired homogeneity of composition.

Accordingly, an object of the present invention is to provide large antimony-bismuth solid solution crystals.

Another object of this invention is to provide large microhomogeneous crystals of concentrated antimony-bismuth solid solutions.

A further object of the present invention is a method of producing large microhomogeneous crystals of antimony-bismuth solid solutions.

Briefly, in accord with one preferred embodiment of the present invention, large homogeneous crystals of concentrated antimony-bismuth solid solutions are produced by providing a substantially pure, homogeneously mixed polycrystalline body consisting of from 2 to 16 atomic weight percent antimony, the remainder bismuth. Thereafter, a controlled directional crystallization from the molten phase is carried out on the body at a much slower rate than heretofore contemplated. It has been found that monocrystalline ingots consisting essentially of the antimony-bismuth solid solutions in the same relative proportions as the polycrystalline body are achieved by a controlled directional crystallization that progresses through the body at a rate of from 0.2 to 2.0 millimeters per hour. Formation of homogeneous crystals is enhanced by providing a thermal gradient in the region of crystallization of about 60° C. per/cm.

The features of my invention that I believe to be novel are set forth with particularly in the appended claims. My invention itself, however, both as to its organization and method of operation, together with further objects and advantages thereof, may best be understood by reference to the following description taken in connection with the accompanying drawing in which:

Controlled directional crystallization has heretofore not been successful in producing large homogeneous crystals in concentrated solid solutions wherein the solution contained a substantial atomic weight percent of each element. I have discovered that such prior attempts failed largely as a result of conducting controlled directional crystallization at a rate of progression which was much too large. More specifically, in accord with the present invention has been discovered that extremely slow rates of progression, in the order of from 0.2–2.0 millimeters per hour (mm./hr.) yield large homogeneous crystals consisting essentially of from 2 to 16 atomic weight percent antimony, with the remainder being bismuth. Small amounts of impurities which do not affect the basic characteristics of the crystal but which enhance or reduce a specific property may also be included. It has been discovered that controlled directional crystallization at these extremely slow rates prevents separation of antimony from the antimony-bismuth system.

Figure 1:
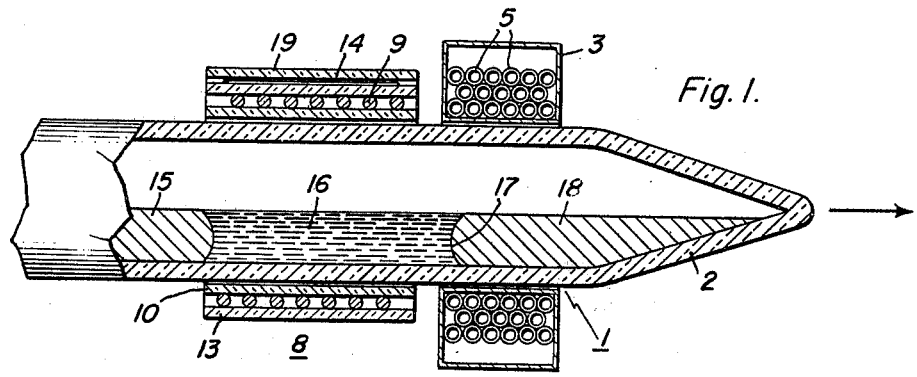
FIGURE 1 is a cross-sectional side view of apparatus suitable for use in practicing the invention.
Figure 2:
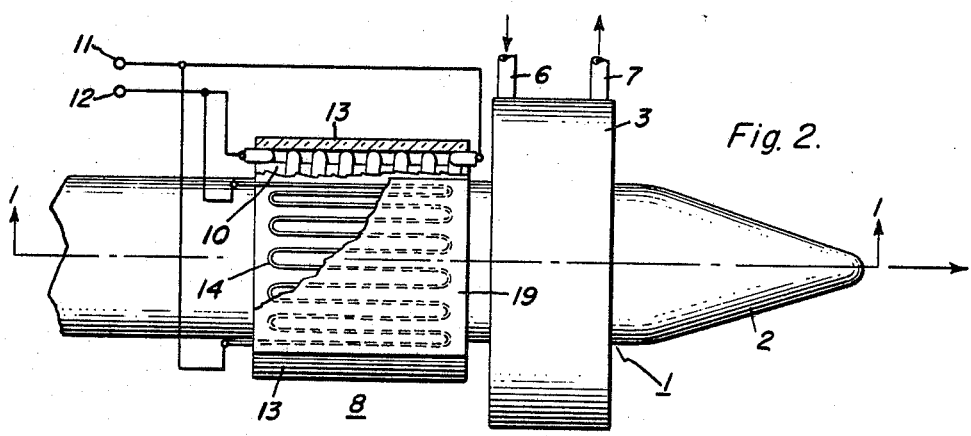
FIGURE 2 is a partially sectioned top view of the apparatus of FIGURE 1.

In the cross-sectional side view of FIGURE 1 and top view of FIGURE 2 there is shown a zone melting apparatus suitable for use in accord with the present invention. This apparatus includes a receptacle 1 that may, conveniently, be fabricated of quartz which is free of all striation flaws. Such flaws would rapidly lead to fracture of receptacle 1. The receptacle includes a tapered portion 2 that is used to promote nucleation and growth of a single crystal inside the receptacle 1.

Receptacle 1 is surrounded by a closely fitting annular cooling jacket that is constructed of a material of high thermal conductivity, as copper, enclosing a plurality of turns of tubing 5 having connections 6 and 7, as seen in FIGURE 2, adapted to be connected to a source and drain, respectively, for a cooling liquid, as water. Positioned adjacent cooling means 3 is heating means 8 that preferably consists of a plurality of turns 9 of resistance wire disposed in a helical configuration, as shown, about insulating tube 10, that is constituted preferably of quartz. Turns 9 terminate in a pair of electrical terminals 11 and 12 that are adapted to be connected to a source of electrical energy. A cylindrical insulating jacket 13, conveniently constituted of quartz, overlays turns 9 and carries a transverse winding of resistance wire 14 on its outer surface. The extremities of wire 14 are preferably connected to electrical terminals 11 and 12, although wire 14 can be separately energized. Heating of the material within receptacle 1 is provided by conduction and radiation, caused by the high temperature attained by turns 9 and the top heater comprising resistance wire 14.

Receptacle 1 encloses a charge 15 constituted of a polycrystalline mixture of semiconductive material which comprises the elements desired to be present in a large single crystal. Heating means 8 causes melting of charge 15 in the vicinity of turns 9, resulting in a liquid zone 16. Liquid zone 16 recrystallizes along convex interface 17 that is in the vicinity between heating means 8 and cooling means 3. Solid solution 18 is a homogeneous single crystal produced by the controlled directional crystallization occuring at freezing interface 17 as receptacle 1 is moved relative to cooling means 3 and heating means 8. Preferably, a heat-reflecting shield 19 is positioned adjacent the top of heater 8 to focus heat upon interface 17 to enhance formation of the desired convex form thereof. The shield can conveniently be constituted of a quarter section of quartz tubing having the inner surface thereof silvered.

In accord with the present invention, charge 15 is a substantially pure homogeneously mixed polycrystalline body consisting essentially of from 2 to 16 atomic weight percent antimony, remainder bismuth. The temperature of molten portion 16 is selected to be in the order of about 300° C. by suitably varying the magnitude of the source of power to which terminals 11 and 12 are connected. Controlled directional crystallization from the molten phase occurs at freezing interface 17 and progresses at a rate of about 1 millimeter per hour, and preferably in the range from 0.2–2.0 millimeters per hour. Control of the rate of progress of crystallization is achieved by suitably adjusting the relative motion between receptacle 1 and the heating and cooling means 3 and 8 by any of a plurality of means well-known in the art.

The thermal gradient established in the vicinity of freezing interface 17 is preferably about 60° C./cm., because such gradient can conveniently be attained with a cooling means 3 using water, although the thermal gradient can fall within the range from 25° C./cm. to 100° C./cm. The low gradient of 25° C./cm. is normally attained without the use of any cooling means 3 by relying upon loss of heat by convection to the surrounding atmosphere.

In general the rate of progression of freezing interface 17 is advantageously selected as approximately 0.2 mm./hour when the mixed polycrystalline charge 12 consists of 16 atomic weight percent antimony and the thermal gradient is about 25° C./cm. Faster rates of progression can be used to advantage by increasing the thermal gradient and/or providing a charge having a lesser atomic weight percent antimony. The latter of course, results in a crystalline body 18 having a similarly reduced proportion of antimony. With a charge consisting essentially of about 2 atomic weight percent antimony in the presence of a thermal gradient of about 100° C./cm. the rate of progression is advantageously selected to be about 2.0 mm./hour.

I have found that the utilization of rates of progression of the freezing interface in the range just mentioned results in the growth of large single crystals of antimony-bismuth. Furthermore, these crystals are homogeneous to a degree not previously obtained even in polycrystalline bodies. Specifically, monocrystalline ingots have been produced in accord with my invention which are on the order of four inches long and one inch across the diameter of the hemisphere. These crystals have been found to be microhomogeneous, that is, the crystals have been found to be of constant composition to within one percent in regions as small as 0.1 millimeter in diameter. In other words, if any region of 0.1 millimeter diameter or larger is selected from the crystal, its composition is the same as that of the overall crystal to within one percent.

The explanation of my discovery that such improved results can be obtained by utilizing rates of progression as described above depends on a consideration of the conditions which exist at the interface between the crystal and the solution. Due to their different freezing points, bismuth and antimony tend to crystallize out of solution at different rates. This difference is measured by the segregation coefficient which is the ratio of the concentration of impurity in the solid to that in the liquid which is in equilibrium with it. Specifically, it is known that in the case of crystal growth from antimony-bismuth solutions, the crystal has a higher antimony concentration than the liquid at the interface. Therefore, in a steady state case of constant freezing from solution by constant movement through a temperature gradient, there is a region in the solution adjacent the crystal-solution interface in which the antimony is depleted.

Figure 4:
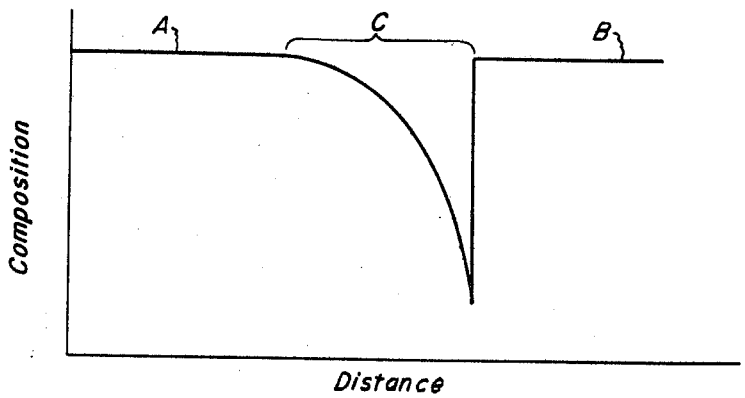

A plot of composition versus distance is shown in FIGURE 4 to illustrate this situation. This figure is greatly enlarged for clarity since the length represented thereby is usually less than $10^{-3}$ centimeters. The portion of the curve marked A represents the composition of the main body of the solution or liquid. This is the same as the composition of the charge initially placed in the system. The portion of the curve marked B represents the composition of the single crystal and is the same as that of the charge and of the solution. The relative motion in the system is such that the crystal is enlarging to the left in FIGURE 4.

The portion of the curve marked C is the depletion region described above. As shown, the percentage of antimony in this region decreases from the level of the charge to a minimum at the interface. The length of the depletion region C is proportional to the rate of diffusion of antimony is bismuth and is inversely proportional to the speed at which the crystallization progresses. In other words, the length $l$ of the depletion region is given by the following equation:

$$l = D/r$$

where:

D = the diffusion coefficient; and
r = the rate of progression.

Figure 5:
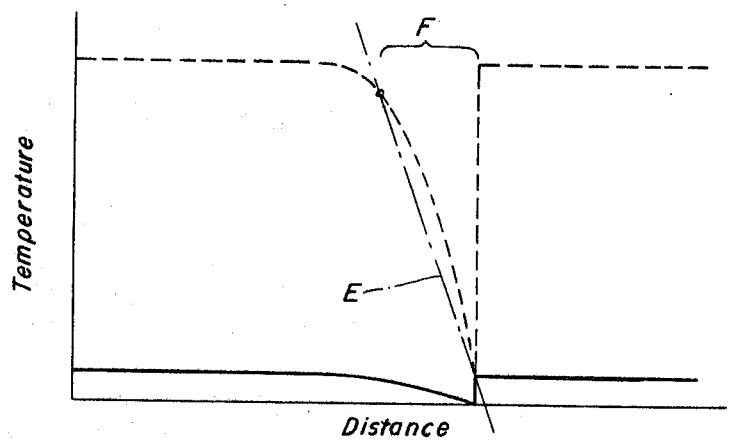

My invention is predicated upon the realization that, in the depletion region, the melting point curve of the solution is significantly higher than the freezing point curve and that this curve must be considered and adjusted relative to the temperature gradient established in the system. FIGURE 5 shows a plot of the melting point and freezing point curves corresponding to the situation illustrated in FIGURE 4. The solid line represents the freezing point curve and the dotted line represents the melting point curve. The dash-dot line E represents a typical temperature gradient which established temperatures above the freezing point in the solution and below the freezing point in the crystal. It is noted that the situation represented here is one in which the rate of progression is higher than the above-described range.

The amount of antimony depletion is not dependent on the rate of progression. The length of the depletion region, as stated above, decreases with increasing rate of progression. Therefore, a high rate of progression establishes a high rate of depletion and a correspondingly high rate of change in the melting point. As shown in region F of FIGURE 5, the melting point of the solution is then higher than the temperature maintained therein. This causes constitutional supercooling to occur within the region F and any disturbance introduced into the system can cause fractional crystallization of the excess antimony in this region. The results of such precipitation are, first, a change in the composition of the solution which causes a corresponding change in the composition of the growing crystal and, second, the formation of a large number of crystals on which nucleation and deposition may take place. Thus, the inhomogeneous polycrystalline form results.

The situation illustrated in FIGURE 5 could be corrected by the provision of a very steep temperature gradient. However, in practice, equipment to provide and control such a temperature gradient is not available.

Figure 6:
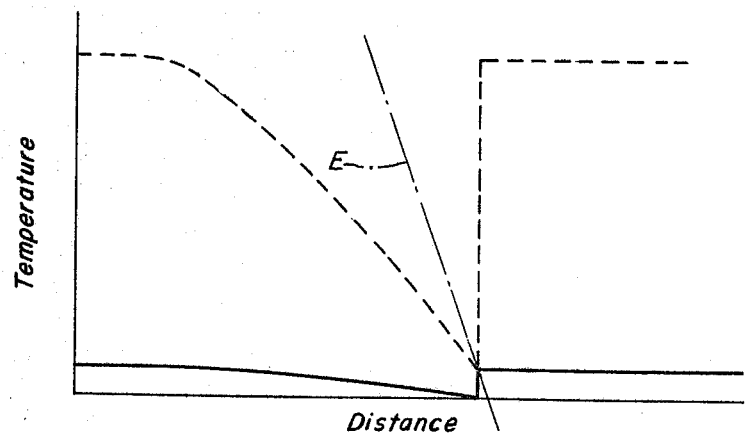

In accord with the present invention, the rate of progression of the freezing interface is reduced so as to increase the length of the depletion region. FIGURE 6 shows a plot of the temperature conditions corresponding to an increased depletion region. As can be seen from a consideration thereof, the melting point curve rises at a slower rate so that it never rises above the temperature gradient, supercooling is never encountered and no fractional precipitation can occur. Accordingly, the cause of the above-noted inhomogeneity and polycrystallinity is avoided and microhomogeneous single crystals can be grown.

More precisely, to avoid the constitutional supercooling illustrated in FIGURE 5, the difference in temperature between the melting point and freezing point of the composition being grown divided by the length of the depletion region must be less than the temperature gradient. That is $$\Delta T_{LS}(\text{percent})/l < G$$

where:

G = the temperature gradient;

$\Delta T_{LS}$(percent) = the difference in temperature between the melting point and freezing point at the percentages involved in the desired composition; and
$l$ = the length of the depletion region previously defined.

Since $l$ is given by the ratio of the diffusion coefficient D to the rate of progression $r$, this equation becomes $$\Delta T_{LS}(\text{percent}) r/D < G$$

Solving this equation for $r$, $$r < GD/\Delta T_{LS}(\text{percent})$$

This equation is the condition which must be met to avoid the difficulties previously noted.

In a typical case, the temperature gradient is 60° C./cm., $\Delta T_{LS}$(percent) for an alloy of 15 percent antimony and 85 percent bismuth is about 90° C. and the diffusion coefficient is about $2 \times 10^{-5}$ cm.$^2$/sec. The proper rate of progression is therefore determined as follows:

$$r < \frac{60°C/cm. \times 2 \times 10^{-5} \text{ cm.}^2/\text{sec.}}{90°C}$$

$$r < \frac{120}{90} \times 10^{-5} \text{ cm./sec.} \times 10 \text{ mm./cm.} \times 3600 \text{ sec./hr.}$$

$$r < 0.48 \text{ mm./hr.}$$

In other words, to avoid the difficulties encountered in prior methods, the rate of progression must be less than 0.48 mm./hr.

By way of illustration only, and not to be considered in a limiting sense, the present invention has been practiced in accordance with the following specific examples.

EXAMPLE I

A length of quartz tubing having a 1¼ inch outside diameter and a one millimeter wall thickness was heated and drawn out so as to have a 3 inch tapered front with a 6 inch body. A seven millimeter diameter open-ended quartz tube was sealed to the upper part of the body at both ends. The receptacle so formed was filled with about 500 grams of 99.9999% purity antimony and bismuth shot. This charge was constituted of 14 atomic weight percent antimony and 86 atomic weight percent bismuth. The charge, although hyperpure in regard to metallic elements, contained included oxides. The cleaning process is as follows.

The 500 gram charge was first vacuum melted to drive out the easily volatilized impurities. The melt was then rapidly directionally frozen, being careful that each section of solid did not crystallize so rapidly so as to create a liquid core, since subsequent freezing of the liquid core strains the quartz and breakage is likely to occur. After the tube was cooled, it was removed from the vacuum system and any non-volatile slag was removed from the surface by etching. The ingot was remelted and any remaining oxide removed by firing in a dynamic flow of clean dry hydrogen at a temperature of 500° C. The etching and hydrogen firing techniques were repeated until all traces of slag were removed, since slag inhibits single crystal growth. The tube was then evacuated and sealed off.

In order to ensure a homogeneously mixed polycrystalline charge the material was mixed in the molten state by continuously rocking the quartz receptacle for about three days time. The charge was then slowly frozen over a six hour period. The polycrystalline charge so prepared then underwent a controlled directional crystallization by placing the receptacle in a horizontal zone melting apparatus of the type described in conjunction with FIGURES 1 and 2. Crystallization was controlled to provide a rate of progression of the freezing interface of approximately 1.6 millimeter/hour.

The water cooling jacket formed a slip fit to the quartz receptacle and was mounted so that its leading edge was about ⅛ inch behind the edge of the furnace. With this configuration and with at least half of the ingot inside the cooler, the temperature gradient in this zone was determined to be about 60 C./cm. by placing thermocouples in the ingot inside the receptacle.

A single zone pass at a rate of progression of about 1.6 millimeters/hour provided a large single crystal constituted of about 14 percent antimony, remainder bismuth.

EXAMPLE II

The method of Example I was carried out with a charge containing 13 atomic weight percent antimony, remainder bismuth. The controlled directional crystallization was slowed to a rate of progression of 0.4 millimeter/hour. The result was a large single crystal constituted of 13 percent antimony, remainder bismuth.

The relative concentrations and microhomogeneity of the alloy crystals produced in accordance with Examples I and II was determined by chemical titrations and by electron beam microprobing. The electron beam microprobing was carried out using a 10 micron beam with analyses at 50 micron intervals.

Figure 3:
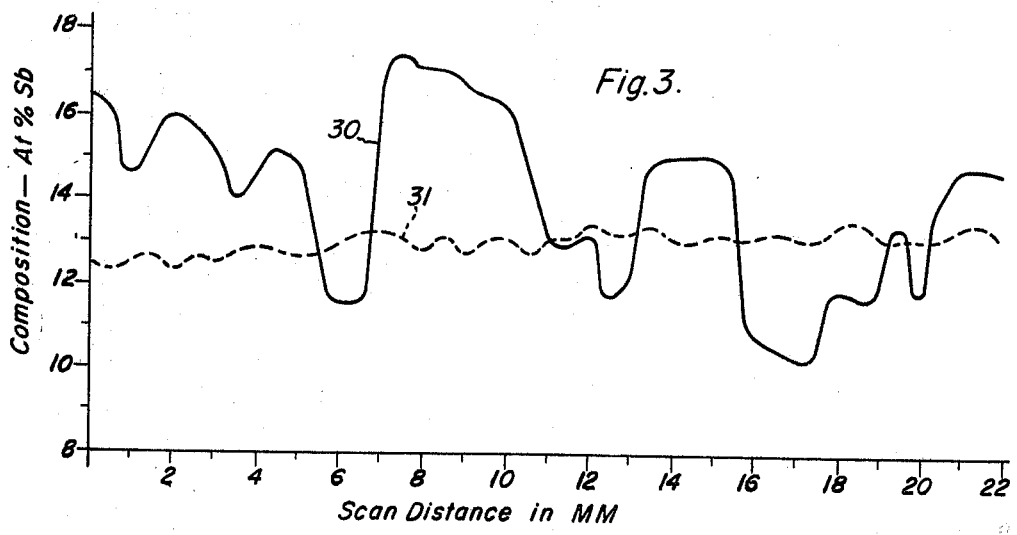
FIGURE 3 is a graph of the concentration of antimony in a crystal antimony-bismuth solid solution versus distance across a cross section of the crystal body for crystals produced in accord with the present invention; and, FIGURES 4, 5 and 6 are graphs illustrating the composition and temperature conditions at the liquid-crystal interface.

FIGURE 3 is a graph of the percentage by atomic weight of antimony in the crystal versus distance in millimeters along a cross section of the crystal body. Curve 30 is a plot of data taken with the crystal produced in accord with Example I and curve 31 of FIGURE 3 illustrates data taken with the crystal grown in accord with Example II. With the crystal grown in accordance with Example I, variations in antimony concentration over distances of 100 to 200 microns are from 20 to 40 percent. As contrasted with this, the crystals grown at the slower rate of Example II exhibit less than 10 percent variation in the concentration of antimony over the entire distance analyzed. Thus, from FIGURE 3 the advantage derived by controlled directional crystallization at the extremely slow rate of progression in accord with the present invention are readily apparent when it is desired to produce a single large crystal of a concentrated solid solution consisting of about 13 or 14 atomic weight percent antimony, the remainder bismuth. However, the faster rate of progression of Example I is advantageously used to produce a crystal of homogeneity comparable to that provided by the process of Example II when the concentrated solid solution contains a lesser atomic weight percent antimony, in the order of about 4 percent. Also, the growing rate is advantageously varied in the same direction as changes in the thermal gradient maintained in the vicinity of the freezing interface.

The thermoelectric figure of merit is used as an indication of the efficiency with which a given material performs as a thermoelectric device. The large homogeneous crystals produced in accordance with this invention have been found to exhibit large figures of merit, particularly at lower temperatures. Also, the figure of merit is largest for heat flow oriented perpendicularly to the axis of crystal growth. For example, a figure of merit of about $6 \times 10^{-3}$ per °C. has been observed in a large homogeneous crystal produced in accord with this invention and consisting essentially of 5 atomic weight percent antimony, remainder bismuth, at a temperature of about 100° K.

Acceptor and/or donor impurities are advantageously introduced into the antimony-bismuth charge after the cleaning step and before the tube is evacuated and sealed off, as detailed in Example I. For example, lead, tin and other acceptor impurities in concentrations in the order of 20 parts per million increase thermoelectric efficiency.

A method of growing large micro-homogeneous single crystal antimony-bismuth solid solutions containing from 4 to 16 atomic weight percent antimony has been described in detail herein. The crystals are produced using an extremely slow rate of controlled directional crystallization in the order of from 0.2–2 mm./hour, depending upon the exact concentration desired and the thermal gradient maintained in the vicinity of the freezing interface. Such crystals are highly desirable in many applications including use in thermoelectric apparatus.

While only certain preferred features of the invention have been shown by way of illustration, many modifications and changes will occur to those skilled in the art.

What I claim as new and desire to secure by Letters Patent of the United States is:

1. A method of producing a large semiconductive crystal that exhibits high thermoelectric efficiency, which method comprises: providing a substantially pure, homogeneously mixed polycrystalline body consisting essentially of from 2–16 atomic weight percent antimony, remainder bismuth; heating at least a portion of said body to a first temperature of about 300° C. at which temperature said portion is molten; providing a temperature gradient from said first temperature to a temperature below the freezing point of said composition; establishing controlled directional crystallization from the molten phase by moving said temperature gradient relative to said body at a rate of progression which is not greater than the quantity $$\frac{GD}{\Delta T_{LS}(\text{percent})}$$

where:

G = the temperature gradient;
D = the diffusion coefficient of antimony in bismuth; and
$\Delta T_{LS}$(percent) = the difference between the melting point and freezing point of said composition, to provide a monocrystalline ingot of concentrated antimony-bismuth solid solution, said ingot being of constant composition within one percent over any region thereof which is larger than 0.1 mm. in diameter.

2. The method of claim 1 wherein said rate of progression is in the range from 0.2–2 mm./hour.

3. The method of claim 4 wherein said rate of progression is about 1 millimeter per hour.

4. The method of claim 2 wherein a temperature gradient of about 60° C./cm. is established and maintained in the region of the freezing interface during said controlled directional crystallization.

References Cited

UNITED STATES PATENTS

| 3,090,207 | 5/1963 | Smith | 136—240 XR |
| 2,739,088 | 3/1956 | Pfann | 148—1.6 XR |

OTHER REFERENCES

A. L. Jain, Physical Review, vol. 114n6, June 1959, pp. 1518–1528.

British Journal of Applied Physics, vol. 14, 1963, pp. 161 and 162.

L. DEWAYNE RUTLEDGE, Primary Examiner

P. WEINSTEIN, Assistant Examiner

U.S. Cl. X.R.

23—295; 75—134; 136—240; 252—62.3